(12) United States Patent
Johnson

(10) Patent No.: US 11,684,062 B2
(45) Date of Patent: Jun. 27, 2023

(54) WEEP HOLE GUARD

(71) Applicant: Matthew E Johnson, Houston, TX (US)

(72) Inventor: Matthew E Johnson, Houston, TX (US)

( * ) Notice: Subject to any disclaimer, the term of this patent is extended or adjusted under 35 U.S.C. 154(b) by 54 days.

(21) Appl. No.: 17/248,503

(22) Filed: Jan. 27, 2021

(65) Prior Publication Data

US 2022/0232818 A1 Jul. 28, 2022

(51) Int. Cl.
*A01M 29/30* (2011.01)

(52) U.S. Cl.
CPC .................................. *A01M 29/30* (2013.01)

(58) Field of Classification Search
CPC ..... A01M 29/30; A01M 29/34; E04B 1/7038; E04B 1/7053; E04B 1/7069; E04B 1/7076; E04B 1/7061; E04B 1/72; E04C 1/392
USPC .................. 52/169.5, 220.8, 302.1, 302.7
See application file for complete search history.

(56) References Cited

U.S. PATENT DOCUMENTS

| | | | | |
|---|---|---|---|---|
| 3,257,929 | A * | 6/1966 | Kortvely | E04B 1/7076 454/280 |
| 4,102,093 | A * | 7/1978 | Harris | E04B 1/7053 52/517 |
| 5,937,594 | A * | 8/1999 | Sourlis | E04B 1/7061 52/562 |
| 6,044,594 | A * | 4/2000 | Desselle | E04B 1/7053 52/302.3 |
| 6,883,284 | B1 * | 4/2005 | Burgunder | E04F 17/00 52/302.1 |
| 9,353,962 | B2 * | 5/2016 | Lowe | E04D 13/176 |
| D808,504 | S * | 1/2018 | Janesky | D23/261 |
| 2007/0017175 | A1 * | 1/2007 | Tamlyn | E04B 1/7069 52/302.7 |
| 2009/0019793 | A1 * | 1/2009 | Huber, Jr. | E04B 1/70 52/101 |
| 2013/0042543 | A1 * | 2/2013 | Letts | E04D 13/152 52/302.1 |
| 2016/0208481 | A1 * | 7/2016 | Flint | E04B 1/7076 |

* cited by examiner

*Primary Examiner* — William V Gilbert

(57) ABSTRACT

A weep-hole cover for existing weep-holes in exterior masonry walls that allows moist air passage into and out of the exterior wall gap and for condensation of water to freely drain. The present invention has a plurality of holes, but prevents entry of larger insects, rodents and snakes behind the masonry wall. Present invention is a single-piece construction and incorporates a vee-shape with its apex inserted into the weep-hole, where the spring of the vee-shape adjusts to a range of weep-hole widths. Exterior flanges provide a means to grip and install the present invention and to limit depth of insertion by resting the flanges on the exterior masonry surface.

10 Claims, 5 Drawing Sheets

WEEP HOLE GUARD

CROSS-REFERENCE TO RELATED APPLICATION

This application claims the benefit of U.S. Provisional Patent application 62/969,127, filed Feb. 2, 2020.

STATEMENT REGARDING FEDERALLY FUNDED RESEARCH OR DEVELOPMENT

Not applicable

FIELD OF INVENTION

The present invention relates to a breathable cover or insert for exterior masonry walls in homes and buildings, where ventilation passages commonly known as weep-holes exist near the foundation that can serve as a path for pest intrusion. The device is not limited to brick masonry walls, but can include types of exterior walls with vent openings such as concrete block and other variations of exterior wall structures.

BACKGROUND OF THE INVENTION

In the United States, there are millions of existing residential homes that have brick exteriors. Masonry walls such as brick siding are often the choice of home owners due to aesthetics and durability, which is why brick is one of the most popular exterior materials for single-family homes in suitable climates. Brick siding usually has an air gap behind it and the home sheathing which is attached to the house interior wall. As governed by building code (ref: 2021 International Building Code Section 1404.4.2 and 2015 International Residential Code Section R703.8.6) and illustrated in the prior art of FIG. 1a, bricklayers build an exterior siding using brick 11 and mortar 12 on a cement foundation 13 supported by ground 14. Periodically, said bricklayers leave an opening with no mortar between bricks 11 located adjacent to the foundation level 13. This opening, creating a cavity for air passage, is commonly called a weep-hole 10. The opening is typically ½ inch wide and approximately the height of the brick 11, dimension D1. The prior art of FIG. 1b shows a sectional view cut through said weep-hole and defines typical brick siding with wall construction (brick 11, mortar 12, foundation 13, ground 14, wall footer 16, vertical stud 17, sheathing 18 and flash 19) including air flow paths 15 and vertical air gap 20. This method prevents moist air from getting trapped in said vertical gap or air space behind the wall, thus allowing moisture and condensation to freely vent to the exterior, so as to prevent rot and mildew from forming. This simple solution is effective, but the very purpose for a breathing space allows pests (insects, snakes, mice and other critters) to climb inside and make a nest, which can damage the wall integrity. In some cases pests can even establish themselves in the attic passages and find a way into the home interior. The location of the weep-hole at the base of the wall also allows splashing water from rain and lawn sprinklers to intrude, which can mold and rot wooden wall footing.

Problem and Need

Once a house is built, it is not immediately obvious how a weep-hole retrofit can solve the pest and water problem. Some homeowners have stuffed various types of copper meshing in the holes to prevent intrusion. Other manufacturers have attempted to market various barriers or covers for protection that have not been well adopted by industry and homeowners. After installation, most devices are not easy to remove for inspection. Furthermore, homes typically have weep-holes every 2-3 feet along the foundation, so you need a large number (about 50-100) devices per residential home to fully complete a retrofit job. When building exterior siding, most bricklayers set the weep-hole width by estimation, so the gap can vary from ¼ to ¾ inch wide and there is a lot of variation. A low cost and easy to install solution is thus needed to solve this challenging problem.

Prior Art—Existing Products on the Market and Shortcomings

Regarding prior art in the field, there are several products being marketed as weep-hole covers or barriers, which are the two main methods of prevention. Covers attempt to address this problem by sealing the entry point and leaving a perforated or screen opening for airflow that unfortunately leaves little opportunity for air to freely move. In the country of Australia, there appears to be significant interest in weep-hole covers. The Weepa brand cover (U.S. Pat. No. 8,171,677) is limited to installation during new construction, but is effective at meeting bushfire compliance codes specific to this locale. The Bug Out Barrier (U.S. Pat. No. 6,360,493) is a cover that must be glued to the outside of the brick and is marketed in the US. It is literally a box cover with a hinged, perforated lid that is glued to the outside of the brick face, not installed in the hole. The invention is made of clear plastic with UV protection and the oversized dimensions are 3½ inches long by 1⅛ inches wide. To install, you prepare the brick exterior face, add caulk adhesive, and apply them to the brick face. This takes time and preparation, and makes the cover frame difficult to remove. Another version in this patent refers to a new construction installation within the weep-hole. A previously disclosed invention (U.S. Pat. No. 5,203,795) is comprised of a multi-part system that incorporates an outside cover and an offset "V" shaped anchor deeper inside the weep-hole. To remove the anchor, a flat-bladed screwdriver is needed to pry the part loose and extract it from the weep-hole. The device method requires the outside cover to be much larger and unsightly than the weep-hole itself.

Another approach with some variants is to install barriers or inserts. The Rid-O-Mice brand cover is a stainless steel, u-shaped device that states it is simple to install, but it usually needs residual mortar between bricks chiseled or drilled out prior to installation, thus risking damage to the mortar and bricks. If the side walls are not clean, then the cover won't slide in. You will likely need to trim the product first to get the right height, using metal shears. To install it, you insert it half-way by hand, then pound it in the rest of the way with a board and hammer. A newer device called the Weep Hole Screen (U.S. Pat. No. 9,903,108) utilizes an additional tool to push a flexible screen into the weep-hole, several millimeters into the wall. Both styles described are hard to remove for inspection. Finally, there is a weep-hole barrier which is sold by Tamlyn Metal Products. The Retrofit Weep Hole Cover is made from sheet metal and is gray in color. It comes in 5 inch or 10 inch stock lengths, must be cut to specific size and may need a contractor to install them. Like Rid-O-Mice brand, the Tamlyn device is installed wide or open end first. Although it does not extend as deep as the Rid-O-Mice model, this type of insert also tends to need cleanout of residual mortar to install and function properly, because the weep-hole walls are contacted by the insert as it is pushed or pounded in place. When these covers are installed, care must be taken to avoid inserting them too far as there is no depth-stop feature.

All products and inventions previously described have one or more drawbacks that the present invention improves upon, as will be shown.

BRIEF SUMMARY OF THE INVENTION

Based on an evaluation of the existing US market and its shortcomings, product needs were analyzed and this aided in guiding the functions of the present invention which is designed for installation after construction of the masonry wall. The first object of the present invention is to provide a simple one-piece fabrication, using a mold or extrusion to minimize cost. The overall height of the one-piece part is selected to fit most weep-hole openings. The second object of the present invention is to provide a one-hand, one-step insertion for installation. Ease of installation/simplicity of use determines utility and customer acceptance. The third object of the present invention to provide a self-adjusting feature to accommodate most brick opening widths, typically from ¼ inch to a maximum ¾ inch range. When masons install brick rows at the foundation, the spacing is not exact and can vary widely. However, variations causing a smaller hole than this range should be carefully knocked out with a chisel to avoid general ventilation blockage. The fourth object of the present invention is to provide combination flange and grip features to prevent the user from installing the device beyond the brick siding outer face. This feature of the present invention acts as a depth-stop function which ensures the device installation process is repeatable, and does not allow the device to get embedded too deep into the opening so that it is not easily retrievable. The fifth object of the present invention is for the device to adapt to variations in brick opening height range. The present invention can be easily cut by scissors and separated into larger and smaller pieces. By taking two larger pieces from separate weep-hole covers, a two-part stacked assembly can be inserted to fill a taller hole. When masons install brick at the foundation, the mortar in the weep-hole can either be left out at the top of the opening, or build-up can unintentionally overfill the opening slightly which demands a taller or shorter weep-hole cover, respectively. The sixth object of the present invention is to retain itself (stay in place) without resting on the bottom of weep-hole opening. This ensures the device stays in place on its own indefinitely, using spring load and/or grip features. For plastic use, an important consideration is ensuring careful material selection of stiffness and creep properties along with incorporating sunlight (ultraviolet ray or UV) inhibitors. The seventh object of the present invention is to provide a minimum airflow passage of at least 50% of the ratio of the total part hole-area to total frontal-area of a weep-hole, assuming an average opening ½ inch wide×2 9/16 inch tall. A large number of holes on the present invention, especially on non-contact faces ensures that the air flow passage is not overly constricted. The last object of the present invention is to have the device easily removable for inspection and cleanout of the weep-hole. A weep-hole cover is not meant to be a permanent guard, and occasional weep-hole inspection is needed.

The advantages of the present invention and how it solves previously existing problems while adhering to all of the above requirements shall be subsequently detailed and further elaborated.

DETAILED DESCRIPTION OF PRESENT INVENTION

Figure 2:
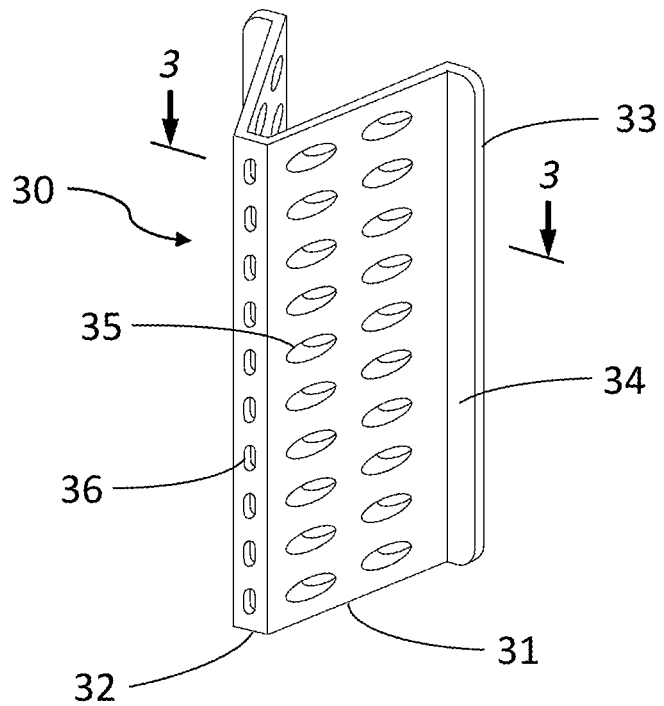
FIG. 2 is a perspective view of the preferred embodiment for the invention.

Referring to FIG. 2, there is shown the preferred embodiment of the weep-hole cover 30 in a perspective view. The present invention is a single part, comprised of three distinct, connecting faces (plates) which include the vee-walls 31, the apex wall 32 at the distal end and the exterior flanges 33 at the proximal end. By its nature of symmetry, the weep-hole cover comprises said exterior flange on opposing sides of the vee shape. Furthermore, the weep-hole cover is defined by a plurality of through-holes on faces of walls 31 and 32. Contact faces 34 are intended for engaging the exterior masonry wall surfaces and limiting depth of insertion. On said vee-wall faces 31, a horizontal hole pattern 35 is repeated vertically, thus creating a matrix in order to allow air passage. Similarly on apex face 32, a vertical hole pattern 36 is defined. In this embodiment there are shown a total of 50 holes that perforate non-contact walls. If the present invention were to be unfolded, as in a flat-pattern, total area with perforations is proportionally large compared to the size (frontal area) of a weep-hole opening. With a quantity of 50 holes, the total air passage area is approximately 50% of the area of a weep-hole opening of ½ inch wide by 2 9/16 inch height. On the exterior flanges 33, corners are rounded for aesthetics and handling.

Figure 3:
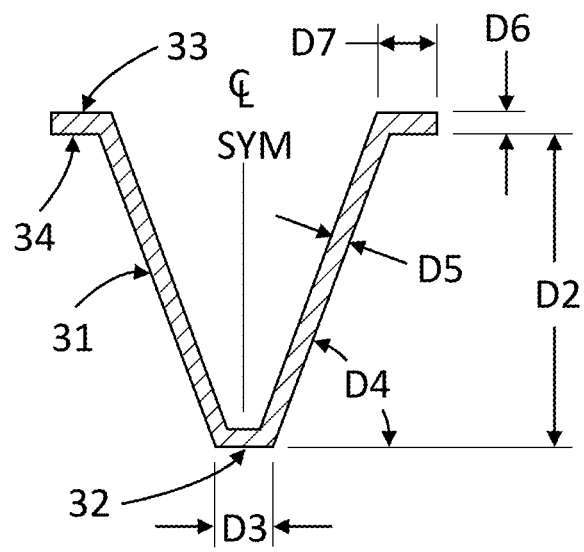
FIG. 3 depicts the section shape for the present invention, in free-state (no load, resting shape).

FIG. 3 depicts the section shape for the present invention in a free-state. It is shown in a no load condition, or its resting shape (free-state). For dimension D2, the apex face 32 at the distal end is approximately 1.0 inch depth relative to the masonry contact faces 34 of the proximal exterior flanges 33, and said apex is centralized to form section shape symmetry about the centerline. Dimension D3 represents the width of said apex at its most distal end, the face of which is preferably 0.2 inches or less to allow for insertion into the most narrow of weep-holes. The angle D4 of the vee-wall face 31 relative to the apex face 32 is preferably 65-70 degrees. The overall width of the vee shape in free-state is greater than the maximum intended weep-hole opening of ¾ inch, so that when the part is squeezed and inserted into said weep-hole, a spring retention force is created. Wall and flange thickness dimensions D5 and D6 are preferably 0.05-0.07 inch, depending on material properties. Selection of wall 31 thickness will define the stiffness of the part, whereas the flange 33 thickness is selected for ease of gripping by fingers. Flange 33 width dimension D7 is governed by masonry exterior wall contact, and structural integrity or compression stability of the vee-shape when the part is squeezed prior to insertion into the weep-hole.

As may be surmised, the presented dimensions in FIG. 3 have proven to be optimum for part functionality, however as dimension D3 decreases towards zero, the result is that a sharp vee-shape is formed, thus creating simple planar intersections of plates with a vertex (apex). Overall, dimension D2 can vary from 0.5-2.5 inches, whereas dimension D4 can vary from 45-85 degrees if desired to create a family of designs. As dimension D2 increases in length, dimension D4 will correspondingly increase in angle to accommodate similar size weep-holes.

Figure 4:
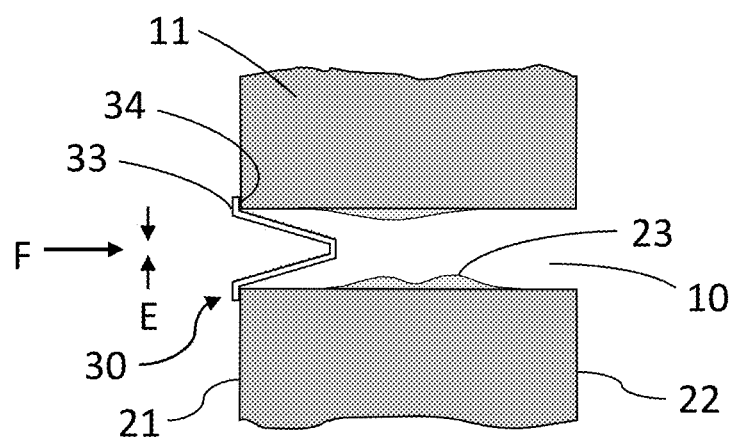
FIG. 4 is a top view of the weep-hole cover as-installed in accordance with the invention.

FIG. 4 is a top view of the weep-hole cover 30 as-installed in weep-hole 10 of the masonry brick 11. Installation is unaffected by excess mortar 23 that may remain deeper in said weep-hole. To install said cover, the user simply squeezes the opposing exterior flanges 33 together in the direction of E and inserts said cover into the weep-hole in the F direction until the flange contact faces 34 meet the masonry exterior faces 21. Masonry interior faces 22 are shown for orientation. Operations E and F are compound forces that occur simultaneously. Installation is complete when the user discontinues squeezing said flanges and releases said cover, thus employing an interference friction fit with the weep-hole walls, while inherently providing a centralizing function for said cover. The advantage of the spring feature facing outward can be appreciated, which allows easy removal for inspection as compared to prior art.

Figure 5:
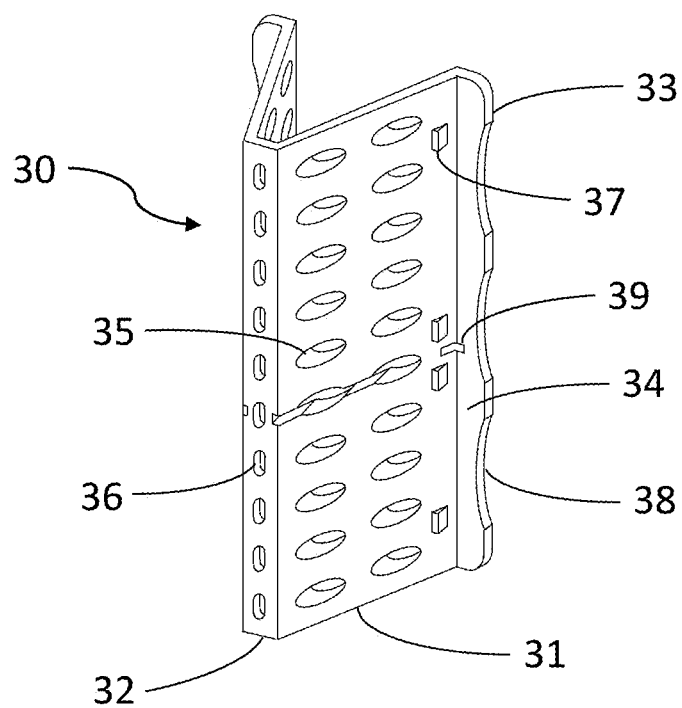
FIG. 5 shows an alternate embodiment of the invention with additional features incorporated.

There are several additional features or embodiments which enhance the basic function of the weep-hole cover 30 previously given in FIG. 2. As can be seen in FIG. 5, one alternate embodiment is comprised of a plurality of teeth 37 on the vee-wall outer faces 31, adjacent to the exterior flange faces 34. The feature improves the engagement and retention of said vee-wall faces to the masonry weep-hole wall edges near the opening. An additional alternate embodiment is defined by a plurality of finger grip features 38 on the outward edge of the exterior flanges 33. Each scalloped contour of said grip is sized to fit a finger and facilitates ease of handling the weep-hole cover during installation. In FIG. 5, it can be further shown that a lateral slit or cutting line 39 is provided, preferably 0.02-0.05 inches wide, which perforates the vee-wall faces 31 and a portion of the exterior flanges 33. It is intentionally located a distance from the part center-height. Said lateral slit facilitates ease of cutting the weep-hole cover into two unequal heights of pieces for the purpose which will be explained subsequently. Within FIG. 5, features 32, 35 and 36 are shown for reference.

Figures 6A, 6B, 6C:
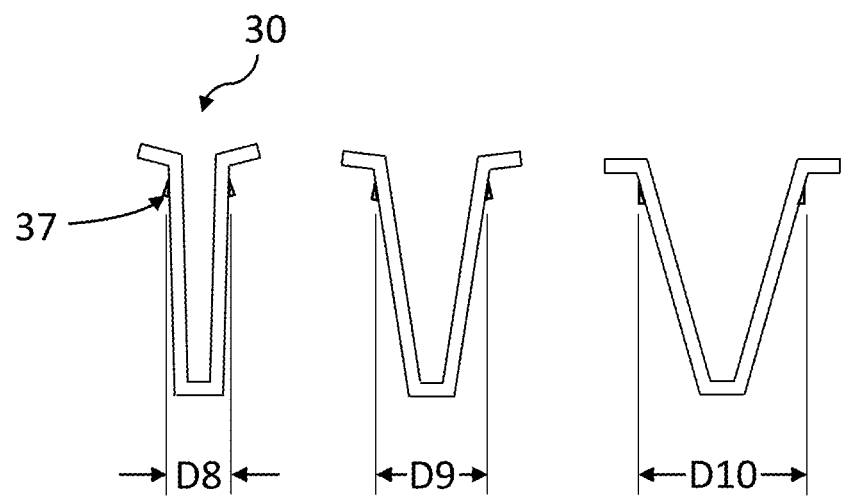
FIGS. 6a, 6b, and 6c is a comparison of the invention as-installed for various weep-hole widths, when the device is squeezed for insertion.

FIGS. 6a, 6b and 6c refer to end-views of the same weep-hole cover 30 previously shown in FIG. 3 and which are illustrated under various conditions of vee-wall compression. Overall width variation when installed in different weep-holes is given and the part gradually increases in width when moving from left to right in the figures. In FIG. 6a, the dimension D8 is typically ¼ inch and this is considered the smallest opening in weep-hole construction by brick layers. The geometry of said cover is compressed and the opposing vee-walls are nearly parallel. As depicted in FIG. 6b compression is gradually relaxed. This width dimension D9 is ½ inch and this represents the average weep-hole width in brick siding. FIG. 6c shows the largest anticipated weep-hole width D10 of ¾ inch, and the accompanying shape of said weep-hole cover. This variation shown does not preclude weep-hole widths outside of the range of dimensions D8 to D10 or of any intermediate widths for the present invention. The alternate embodiment of teeth 37 is indicated to show the relative movement of this feature.

Figure 1A:
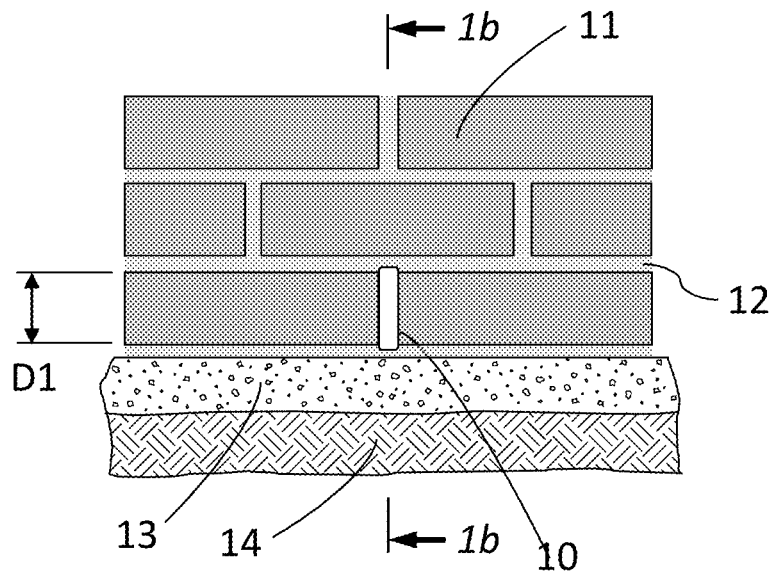
FIG. 1a Prior Art is a front elevation view of a portion of a brick (masonry) wall with a weep-hole located adjacent to the base of the foundation.
Figure 1B:
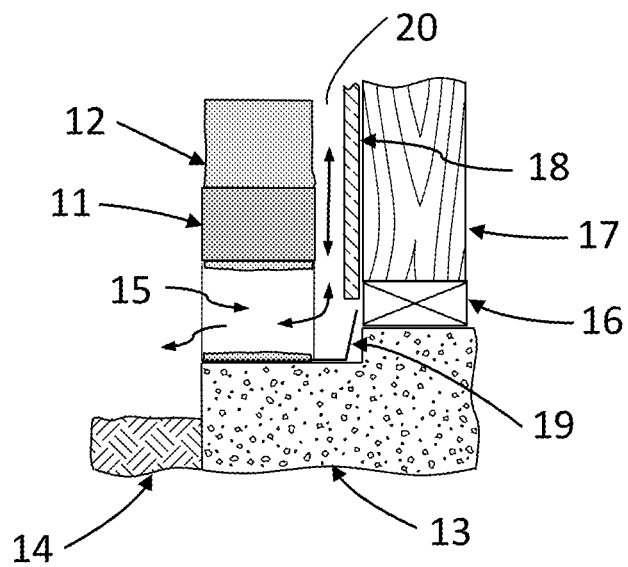
FIG. 1b Prior Art is a sectional view of basic wall construction with weep-hole passage, showing the air ventilation path.
Figure 7:
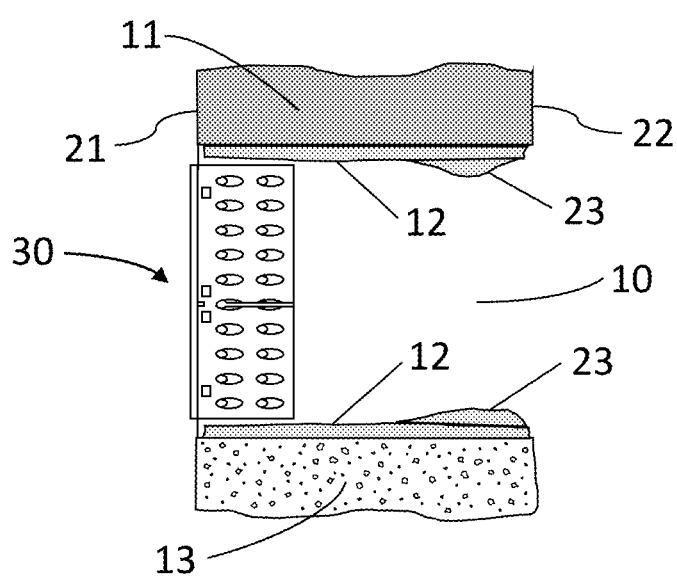
FIG. 7 is a side view of the weep-hole cover as-installed in accordance with the invention.

FIG. 7 depicts a side-view section of the present invention from FIG. 5 as-installed, using the same vantage of FIG. 1b. The foundation 13 below and brick 11 above the weep-hole 10 are shown with construction mortar 12, and the brick exterior 21 and interior 22 wall faces are referenced. When the weep-hole cover 30 is installed, the part is centered vertically between said foundation and the upper brick course with mortar, leaving only small clearance gaps. As previously stated, some excess mortar 23 left over from the masonry process is common, especially further inside the weep-hole which does not affect installation.

Figure 8:
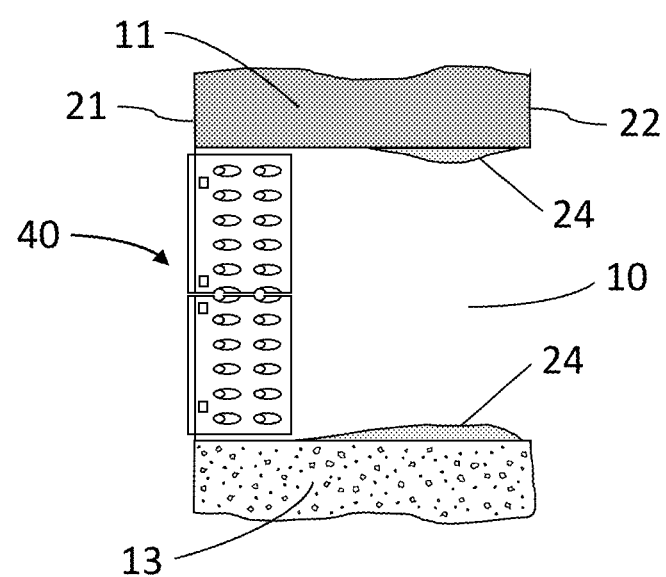
FIG. 8 shows an alternate embodiment, using a combination of two large pieces of the present invention as-installed.

In some instances, when mortar 12 (shown in FIG. 7) is missing during masonry construction of weep-hole 10, especially under said upper brick course 11 but also foundation 13, another method can be employed. As shown in FIG. 8, an alternate embodiment weep-hole cover 40 is installed in the instance of a reduced quantity of mortar 24. This embodiment is simply comprised of 2 larger pieces of part 30 which are stacked in order to fill excess gaps in said missing mortar. Scissors or a similar cutting tool may be used to trim the part 30 along the cutting line 39 previously shown in FIG. 5. Conversely, the remaining smaller pieces of part 30 can be combined and stacked to create a small version of the disclosed invention.

Additional Variations or Alternate Embodiments

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Other variations of the preferred embodiment may include, but are not limited to:

Overall height, depth, and width of weep-hole cover 30;
Apex 32 face width (dimension D3, or distance from vertical edge to vertical edge);
Vee angle and/or wall thicknesses, dimensions D4, D5 and D6 respectively;
Additional ridges or teeth along vee-walls 31 to further grip brick faces;
Number, sizes, shapes and patterns of vent holes 35, 36 (round, rectangular, or other);
Apex 32 with an omission of holes;
Apex 32 with a flat or radius form, or a sharp outer edge;
Fillet and corner radii at intersection of faces 31, 32 and 33;
The present invention formed in a flat-pattern and creased into a vee-shape along bend lines or living hinges;
Exterior flange 33 edge contour (variations of shapes for finger grip);
Exterior flange 33 proximal face imprints (variations of decorative shapes on the exterior faces such as diamonds, scroll work);
Colors and finish of the part;
Material choices of metal stainless steel, formed/molded plastic or other spring-like material;
Pesticide coating of weep-hole cover 30 for additional barrier protection;

Additional fine-mesh screen added to interior faces of vee-wall 31, apex 32, and/or;

Rubber sealed version for flood prevention (no holes, with breathable outward only membrane).

APPLICATION/USE AND CLAIMS

The present invention protects homes and can be used on most exterior brick siding with existing weep-holes. FIG. 4 shows how the device is installed; simply squeeze the exterior flanges together as needed in direction E and push the narrow distal end in the weep-hole opening of the cavity in direction F, until said flanges rest against the brick outer faces. This built-in depth control feature prevents pushing it too far in every time. No tools or sealants are needed for installation. The vee-wall shape and apex avoids contacting inner weep-hole walls, compensates for unevenness and avoids mortar interference further in the weep-hole; it also adjusts for various weep-hole widths as given in FIGS. 6a-6c. The vee-wall spring feature faces outward to the brick exterior and this allows easy removal for inspection. It can be sized for any brick height to accommodate all sizes. The present invention can also be installed on existing apartments, condominiums, and store buildings; anything with a masonry wall that has rectangular weep-holes. This does not limit the present invention from having a modified shape to fit other hole geometries, however.

I claim:

1. A weep-hole cover comprising:
    a first plate and a second plate, said plates being substantially rectangular and each said plate being connected along a respective first side edge to an apex face;
    each said plate having a second side edge opposite said first side edge and a third side edge connecting said first side edge to said second side edge, and a fourth side edge opposite to and substantially parallel to said third side edge;
    each said plate having an inner face oriented to each other, and an outer face opposite said respective inner face;
    said plates are porous to the passage of gases;
    said second side edges of said plates being in contact with opposing edges of an opening of a weep-hole in a wall; and
    said second side edges each having a contact face extending therefrom and substantially parallel to each other, each said contact face contacting an exterior surface of said wall.

2. The cover of claim 1, whereby porosity of said plates porous to the passage of gases comprises a plurality of holes.

3. The cover of claim 1, whereby said apex face has the form of a flat surface, sharp edge, or a curved surface.

4. The cover of claim 1, whereby said second side edges of said plates have a relative distance greater than the width of said opposing edges of said opening of said weep-hole in said wall, prior to insertion of said cover into said weep-hole.

5. The cover of claim 1, whereby a plurality of teeth are located on each said outer faces of said plates, adjacent to each said second side edges of said plates.

6. The cover of claim 1, whereby each said contact face has an outer edge in the form of a scalloped profile.

7. The cover of claim 1, whereby a slit extends substantially from said apex face to each said second side edge through each of said plates, and partially through each of said contact faces, said slit substantially parallel to each said third side edge.

8. The cover of claim 1, whereby fabrication of said cover is a one-piece construction.

9. A method for preventing pest intrusion into an opening of a weep-hole in a wall, comprising:
    providing the weep-hole cover of claim 1, wherein prior to installation of said cover, compressing said contact faces of said cover with human fingers, thereby moving said inner faces of said plates together;
    further, inserting said apex face of said cover into said opening of a weep-hole;
    engaging said contact faces of said cover on the exterior surface of said wall;
    releasing said contact faces of the cover from its compressed state, contacting said second side edges of said plates against said opposing edges of said opening of said weep-hole; and
    upon installation, retaining said cover with frictional force, thus centralizing said cover in said opening of a weep-hole.

10. A method for creating an alternate cover size for installation in an opening of a weep-hole in a wall comprising:
    providing the weep-hole cover of claim 7, wherein first trimming said cover at said slit; and
    stacking with a similarly trimmed said cover; and
    thus ensuring fit into said opening of a weep-hole having missing mortar or an excess of mortar.

* * * * *